March 15, 1955  G. A. TINNERMAN ET AL  2,703,912
STRUCTURAL CONNECTION
Filed April 23, 1948

Inventors
GEORGE A. TINNERMAN
RICHARD A. HARTMAN
H. G. Lombard  Attorney

United States Patent Office 2,703,912
Patented Mar. 15, 1955

2,703,912

STRUCTURAL CONNECTION

George A. Tinnerman and Richard A. Hartman, Cleveland, Ohio, assignors to Tinnerman Products, Inc., Cleveland, Ohio, a corporation of Ohio Application April 23, 1948, Serial No. 22,914

1 Claim. (Cl. 20—92.4)

This invention relates in general to structural joints and connections and deals, more particularly, with improved forms of detachable connectors or fastening devices for uniting panels and other structural members such as those used in the assembly of the walls, ceilings, etc., of prefabricated housing constructions, and the like.

A primary object of the invention is to provide a joint or connection for uniting panels and similar structural members, particularly along adjacent edges thereof, which comprises an improved, highly simplified form of connecting or fastening device that is relatively cheap and inexpensive in manufacture and adapted for an easy and quick assembly in providing a completed joint or connection.

A further object of the invention is to provide such a fastening or connecting device which is adapted to align the adjacent surfaces of the panels secured and draw such surfaces tightly together in providing a joint or connection which is rigid and positive and otherwise strong, durable and reliable.

Further objects and advantages and other new and useful features in the construction, arrangement and general combination of parts of the invention will be readily apparent as the following description proceeds with reference to the accompanying drawings, for purposes of illustration but not of limitation, in which like reference characters designate like parts throughout, and in which.

While the improved fastening or connecting devices of the invention are shown as applied to secure panels of the general type used in prefabricated housing constructions and the like, it will be understood that the connecting devices are not limited to such use and are adapted for a wide range and variety of other applications and uses as fasteners of general utility.

Figure 4:
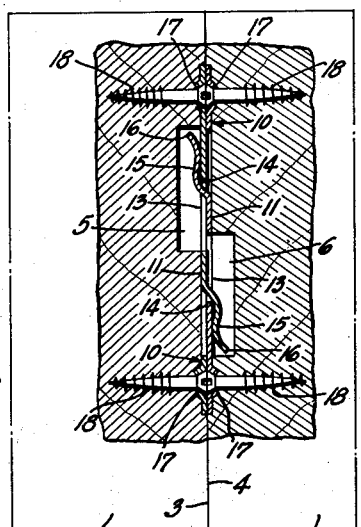
Fig. 4 is a sectional view of the secured panel members showing the adjacent end faces thereof as united in a completed joint or connection provided by the improved connecting or fastening devices of the invention.

Panel members of the general type used in prefabricating housing constructions, for example, usually include wood posts or studding members along the edges and ends thereof forming the frame of the panel. The ends of adjacent panels, accordingly, define end faces which are joined together by the improved connecting devices of the invention. In the present example, the panels or other structural members 1, 2, comprise adjacent end faces 3, 4, which are disposed in abutting, face to face relation in a completed installation as shown in Fig. 4. The said end faces 3, 4, are provided with any form of suitable recesses 5, 6, respectively, which may be expeditiously provided by a simple boring tool or chiseled in the wood surfaces in any convenient manner. In this regard, the invention is highly advantageous inasmuch as the recesses 5, 6, require no great degree of precision, and consequently may be formed with speed and facility in a minimum of time and effort. The recesses 5, 6, accordingly may be readily provided in suitable offset relation as shown in Fig. 4 in a completed joint, and in the required depth for accommodating the interconnected portions of the connectors or fastening devices, as presently to be described. It will be understood that such pairs of recesses 5, 6, are provided along the length of the adjacent end faces 3, 4, of the panels 1, 2, as necessary for the number of fastening or connecting devices required for any particular size or type of installation.

Figure 3:
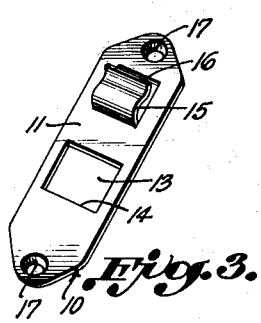
Fig. 3 is a perspective view of one of the connecting devices shown in Figs. 1 and 2.

Over the recesses 5, 6, thus provided, a pair of similar connectors 10, such as shown in Fig. 3, are secured in oppositely extending relation but arranged to coincide with each other in the completed joint as shown in Fig. 4. The connectors are identical and any pair of such connectors is adapted for use as a connecting or joining device in accordance with the invention; this, of course, involves important savings in costs of manufacture in that only a single set of dies is required to make the connectors.

The connector, designated generally 10, Fig. 3, is a relatively simple, inexpensive article of manufacture which is admirably suited for economical quantity production at comparatively low cost in that it may be provided as a simple stamping from standard sheet metal strip stock with little loss or waste of material. The connectors may be made of any suitable sheet metal material preferably of a spring metal nature such as spring steel or cold rolled steel having spring-like characteristics, with the size, thickness, and finish thereof selected according to service requirements and the predetermined size of the parts of the installation.

Figure 6:
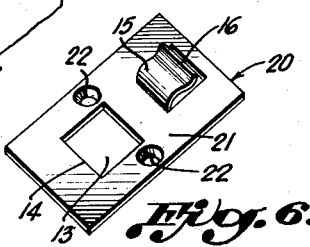
Fig. 6 is a perspective view of an alternate form of the improved connecting or fastening device.

The sheet metal body or stamping defining the connector 10, Fig. 3, is so formed as to provide a base 11 having a cut-out opening 13 defining a connecting web or lip 14. In suitable spaced relation to said cut-out opening 13, an outwardly extending resilient hook 15 is struck and formed from the sheet metal base to project outwardly out of the plane thereof a distance slightly less than the thickness of the connector base 11. Preferably said hook 15 is formed in the manner of a tongue defined by spaced parallel slits in the fastener base with the free end thereof bent into an outwardly flared lip 16 which facilitates the initial application of said hook to connected relation in the completed joint. The hook 15 otherwise is of a width slightly less than the width of the opening 13 so that it is adapted to pass through such an opening in a cooperating connector. Suitable holes 17 are provided in the connector base for receiving screws 18, Figs. 4 and 5, or equivalent stud fastenings such as nails, rivets, or the like. In the form of connector shown in Fig. 3, such screw receiving holes 17 are shown provided at either end of the elongate fastener base 11. In the alternate form of connector 20, illustrated in Fig. 6, the base 21 is sufficiently wide to allow for the provision of similar screw receiving holes 22 at either side of the connector base. If desired, the connector base may be suitably designed for the provision of such screw receiving holes both at the ends and along the sides thereof, or with any other suitable arrangement of such screw receiving holes or equivalent attaching means.

Figure 1:
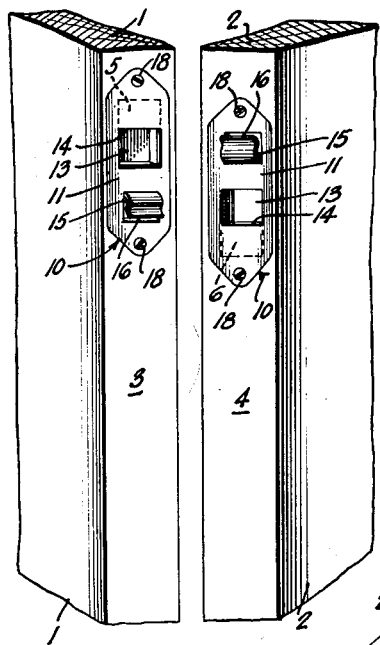
Fig. 1 is a fragmentary perspective view of a pair of complementary panels or similar structural members showing the adjacent end faces thereof as provided with the improved connecting or fastening devices of the invention for securing said end faces together.
Figure 2:
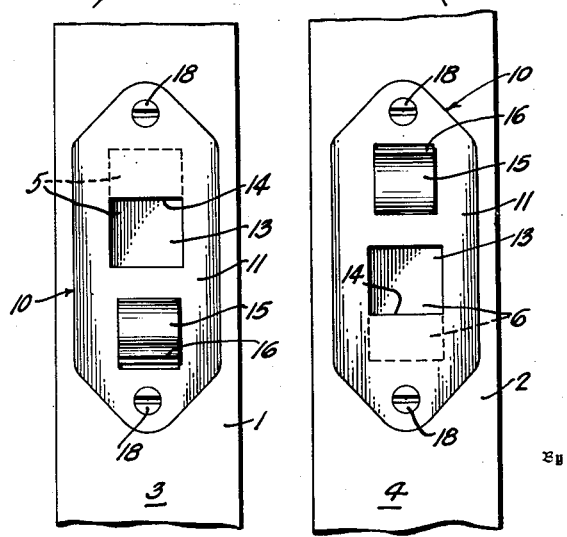
Fig. 2 is an enlarged front elevational view of the adjacent end faces of the panels provided with the improved connecting or fastening devices as shown in Fig. 1.

As shown in Figs. 1 and 2, a pair of connectors 10, Fig. 3, is attached to the end faces 3, 4, of the panels 1, 2, over the respective recesses 5, 6, therein by the screws 18 received in the holes 17 at the ends of the connector base. The connectors are attached in oppositely extending relation with the openings 13 therein in offset relation to the recesses 5, 6 in the end faces 3, 4 of the respective panels. The arrangement is such that the web or lip 14 defined by the hole 13 in each connector extends free in overlapping relation to a portion of the associated recess 5 or 6 over which the connector is secured. Accordingly, the pair of oppositely extending connectors 10 are so disposed that the projecting hook 15 of each connector is adapted to pass through opening 13 in the other connector and be received in the adjacent under-lying recesses 5, 6, in the end faces of the panels, substantially as shown in Fig. 5.

Figure 5:
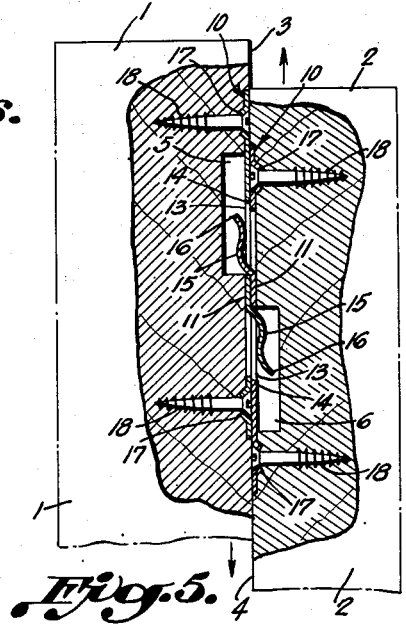
Fig. 5 is a similar sectional view showing the initial step in the operation for securing the connecting or fastening devices together in providing the completed joint or connection shown in Fig. 4.

The hook 15 of each connector is thus initially assembled for engagement with the other connector and when the panels or other structural members 1, 2, are moved relatively to each other in opposite directions as indicated by the arrows in Fig. 5, the hook 15 of one connector engages the free web or lip 14 defined by the opening 13 in the other connector, as shown in Fig. 4. The initial engagement of the hooks 15 with the respective webs or lips 14 is facilitated by the outwardly flared lips 16 on the extremities of said hooks which cam over the edges of said webs or lips 14 and cause said hooks to yield outwardly as necessary to permit sliding movement of said hooks to fully engaged position with said flanges 14, as shown in Fig. 4.

In this position, the hooks 15 are in positive, interconnected spring clamping relation with the respective webs or lips 14 and tend to draw tightly together the adjacent end faces 3, 4, of the panels and otherwise maintain said end faces in firm and rigid abutting engagement with each other in a completed installation under continuously effective spring tension. Inasmuch as the hook 15 of each connector is of a width slightly less than the width of the opening 13 in the other connector, the side edges of a hook are disposed in abutting relation to the side marginal portions of the opening 13 in which it is received. This provides for the desired alignment of the end faces of the panels in secured relation and maintains the same against lateral shifting or displacement from any such secured relation.

In the event that it is necessary to disassemble the panels or other parts thus secured, the connecting devices are disconnected and separated from each other in a reversal of the foregoing described procedure in which the panels are moved relatively to each other to the position shown in Fig. 5 as necessary for the hook 15 of each connector to disengage from the web or lip 14 of the other connector, whereupon the hooks may be withdrawn from secured relation and the panels disassociated.

Although the invention is described in connection with a wall construction or the like which is particularly useful in prefabricated housing constructions and similar structures, it is to be understood that the invention is equally applicable to various other uses as a fastener of general utility within the broad scope and basic teachings of the instant disclosure.

The connector in any form preferably is constructed of relatively thin sheet metal, the thickness of which is selected according to service requirements and the predetermined size of the parts secured. The fasteners are most effective when provided of spring metal suitably spring tempered and otherwise treated to give the desired toughness and hardness, particularly in the case of devices which are put to heavy duty in installations where extreme vibratory motion takes place. A cheap but effective fastener may be provided from cold rolled metal, such as cold rolled steel, which is untempered but of a spring metal nature and capable of providing an effective and reliable fastening means.

What is claimed is:

A connection comprising members having adjoining surfaces each provided with a recess, a connecting device comprising a pair of identical connectors, each of said identical connectors being attached to one of said surfaces over the recess therein and comprising a sheet metal body having a substantially flat base lying substantially flush with the surface to which the connector is attached, said substantially flat base having an opening in its plane intermediate the ends thereof defining a connecting web in said base, and a hook stamped from said base intermediate the ends thereof immediately adjacent to but in completely spaced relation to said opening in said base, said hook projecting outwardly out of the plane of said substantially flat base and having its free end extending away from the connecting web defined by said opening in said base, said identical connectors being in reverse relation to each other in attached position on said adjoining surfaces with said substantially flat bases of said identical connectors coinciding with and abutting each other and said hooks on said connectors extending in opposite directions with the free end of the hook on one connector passing through the opening in the other connector and engaging the connecting web defined by the opening in said other connector in connected relation therewith, said hooks having their free ends received in said recesses in the secured members in such connected relation.

References Cited in the file of this patent

UNITED STATES PATENTS

| 924,912 | Maydl | June 15, 1909 |
| 1,253,764 | Zahner | Jan. 15, 1918 |
| 2,200,158 | Clarke | May 7, 1940 |
| 2,304,020 | Regenhardt | Dec. 1, 1942 |

FOREIGN PATENTS

| 75,943 | Switzerland | Oct. 1, 1917 |
| 102,783 | Austria | Mar. 10, 1926 |
| 329,345 | Italy | 1935 |